United States Patent Office

2,725,321
Patented Nov. 29, 1955

2,725,321

LAMINATED ARTICLE CONTAINING RESINOUS IMPREGNATION COMPOSITION

Norman E. Martello, Turtle Creek, Pa., assignor to Westinghouse Electric Corporation, East Pittsburgh, Pa., a corporation of Pennsylvania No Drawing. Application April 13, 1953,
Serial No. 348,598

12 Claims. (Cl. 154—43)

This application is a continuation-in-part of application, Serial No. 320,343, filed November 13, 1952.

This invention relates, generally, to an emulsified resin varnish for producing bearings, molded plates, tubes, abrasive wheels and the like.

It has been proposed, heretofore, to introduce certain lubricating and wear resistant mineral compounds into selected resinous compositions when the composition is to be used for forming bearings, molded plates, tubes, abrasion wheels or the like. The purpose of adding the mineral compounds is to decrease the coefficient of friction and/or prolong the life of the article produced.

It is customary in producing compositions for such articles as listed above, to prepare an emulsion with the resin and mineral compound while the resin is in the A-stage. A continuous sheet of paper or fabric is then impregnated with the emulsified resin, after which the resin is advanced by heat treatment to the B-stage.

A resinous bearing or laminated article is generally made by stacking in a mold a number of strips, cut from a B-stage resin impregnated sheet, and then curing the resin to the final infusible C-stage by heat and pressure, thereby consolidating the strips into a laminated unit.

Difficulty has arisen in producing such molded articles in obtaining a satisfactory dispersion of the mineral compounds in the resinous compositions due to flocculation and uneven scattering thereof, and also in obtaining a high bond strength in the molded units prepared therefrom.

Further, there was the disadvantage in preparing the emulsified resins of the necessity to heat to temperatures of approximately 100° C. with constant stirring. The resulting suspensions had the further disadvantage of being inherently of high viscosity. Even with the extensive preparations of heating and stirring, the suspensions had little stability, thus necessitating their immediate use.

An object of this invention is to provide an improved resinous bearing material having embodied therein, by means of a novel combined suspending-dispersing agent, a solid lubricant for lowering the coefficient of friction and a wear resistant mineral compound to prolong the life of the bearing.

A further object of this invention is to provide a stable emulsified resin suitable for producing improved laminated articles, the resin having embodied therein one or more mineral compounds by means of a novel combined suspending-dispersing agent comprising a mixture of a suspending agent selected from at least one of the group consisting of carboxy methyl cellulose, methyl cellulose, casein, sodium alginate, and gum tragacanth, and a dispersing agent comprising a lignin sulphonate.

A further object of this invention is to provide a resinous laminated material of high bond strength, the resin having uniformly dispersed therein mineral compounds for modifying the properties thereof.

A further object of this invention is to provide a method of making resinous laminated material comprising the steps of impregnating a fabric sheet with an emulsified resin-varnish having uniformly suspended therein a mineral compound, and then covering the impregnated sheet with a coating of substantially only phenolic resin.

Other objects of the invention will in part be obvious and will in part appear hereinafter.

I have discovered that certain solid lubricants, wear resistant mineral compounds and abrasive mineral compounds can be successfully incorporated in phenolic resinous varnish compositions by means of a novel combined suspending-dispersing agent, thereby enabling the preparation of improved molded articles. The lubricating compounds found to give the best results are graphite, and the sulphides, selenides and tellurides of tungsten, molybdenum, and titanium. The mineral compounds found to give the best wear resistant and/or abrasive properties have been found to be aluminum oxide and silicon carbide. My suspending-dispersing agent is used to incorporate these mineral compounds in a water or alcohol soluble thermosettable phenolic resin, and will provide a stable emulsified phenolic resin varnish, the viscosity of which may be varied as desired. Important advantages of my varnish are that little stirring and no heating are required in its preparation and that the mineral compounds will remain suspended in the stabilized varnish over long periods of time.

In the formulation of the emulsified phenolic resin varnish in accordance with my invention, a water or alcohol soluble thermosettable phenol-formaldehyde, cresol-formaldehyde or a cresylic acid-formaldehyde resin in the A-stage is used. The term "phenolic" as used herein is intended to embrace all of the above type resins. In the production of the type of phenolic base resins referred to, from 0.8 to 2 moles of 40% aqueous formaldehyde, para-formaldehyde or other polymers thereof and other aldehydes, as well known to those skilled in the art, are reacted with one mole of a phenol. A water soluble phenolic resin suitable for this application is described in the patent to Weltman et al. No. 2,579,637, issued December 25, 1951.

In the compositions of this invention there are embodied one or more lubricating mineral compounds or wear resisting mineral compounds, or combinations of both, to provide an article having desired properties suitable for the type of service for which the article is designed. The amount of a mineral compound that may be suspended individually in the emulsified resin varnish of my invention is as follows, based on the weight of the emulsified resin varnish: 5% to 30% of aluminum oxide, 10% to 60% of silicon carbide, 3% to 20% graphite, or 2% to 20% of the sulphides, selenides, and tellurides of tungsten, molybdenum and titanium. The minerals are employed in a finely divided state, preferably passing through a sieve having 200 or more meshes to the lineal inch.

As the suspending agent for the mineral compound, I employ from 0.5% to 3% by weight, based on the weight of the emulsified resin varnish of at least one material selected from the group consisting of carboxy methyl cellulose, methyl cellulose, casein, sodium alignate, and gum tragacanth.

To prevent flocculation of the mineral compound and suspending agent, a dispersing agent in the amount of from 0.1% to 3% by weight, based on the weight of the emulsified resin varnish, of sodium or calcium lignin sulphonate or both is used. In order to insure solubilizing of the dispersion agent, a small, but effective amount, in the order of 0.1% of an alkali, such as sodium hydroxide or potassium hydroxide, is added.

When a water solvent phenolic resin is used, from 5% to 20% by weight, based on the weight of the emulsified resin varnish, of a simple alcohol such as methyl, ethyl, or propyl alcohol may be admixed with the resin varnish to act as a stabilizing agent therefor.

The components of the phenolic resin varnish formulation, except the mineral compound, are admixed and stirred thoroughly in a mixer for a few minutes and the composition is then ready for the addition of the finely divided mineral compound. The mineral compound is added to the phenolic resin varnish and stirred for a few minutes until the mineral compound is suspended therein. It is then ready for use as an impregnant for fibrous materials such as a fabric or paper to be later molded into laminated or other fibrous reinforced bearings. Examples of other suitable fibrous materials are cotton duck, cambric and the like. The base fabric or paper may be impregnated with the phenolic resin varnish in any conventional manner, for example, as described in the patent to Weltman et al. No. 2,579,637.

The base fabric or paper is initially impregnated with an amount, sufficient to provide a resin ratio of from 1.4 to 2.0, of the emulsified phenolic resin with the solid lubricant suspended therein and then advanced to the B-stage. In order that the finished bearing will have a higher bond strength, the initially impregnated sheet may be further impregnated with a conventional varnish composed substantially only of phenolic resin, that contains no solid lubricant. The conventional phenolic varnish, is added to the previously impregnated fabric in an amount sufficient to provide a B-stage sheet having a resin ratio of from 1.8 to 2.5.

Resin ratio is defined as the ratio of the weight of the untreated fabric sheet plus the weight of the resin that is impregnated in the sheet, to the weight of the untreated sheet.

The B-stage sheets are cut to size and molded in a hot press at pressures of from 500 to 2000 p. s. i. or higher and at temperatures of from about 140° C. to 160° C. It is to be understood, that if desired, the B-stage sheets may be run through a chopper, and the macerated material molded into an article.

The following is an example of the preparation of an emulsified resin varnish in accordance with my invention.

*Example I*

To 3.9 parts by weight of water was added 0.1 part by weight of sodium hydroxide, and 0.3 part by weight of calcium lignin sulphonate. The mixture was stirred until the ingredients were dissolved. To a separate quantity of 11.7 parts by weight of water was added 4 parts by weight of carboxy methyl cellulose, and this was stirred until the carboxy methyl cellulose was dissolved. Then while stirring 80 parts by weight of a water solution of an A-stage phenol-formaldehyde resin of the type described in the patent to Weltman et al. No. 2,579,637, containing 75% by weight of the resin, the previously prepared solutions of sodium hydroxide-calcium lignin sulphonate and the carboxy methyl cellulose were added, with stirring being continued for fifteen minutes thereafter. The emulsified phenolic resin composition was then ready for addition of a mineral compound. There was then added 6.6 parts by weight of 325 mesh molybdenum disulphite to the composition with rapid stirring. In a few minutes an even suspension was produced.

The molybdenum disulphide may be added immediately to the phenolic composition and the suspension stored until ready for use or the molybdenum disulphide may be added later when desired, i. e. up to a time immediately preceding the impregnation of a fabric or paper with the phenolic resin-molybdenum disulphide suspension.

The composition was of such low viscosity that it was employed to impregnate 50 ounce woven cotton belting. The belting was well impregnated to provide B-stage phenolic resin and lubricant to a 1.5 ratio, and the molybdenum disulphide coated the cotton fibers evenly. The belting was further impregnated with a varnish comprising substantially only the phenolic resin used in the making of the suspension, and advanced to the B-stage to provide the belting with a total resin ratio of 1.9. A plurality of plies of the impregnated belting were superimposed and molded in a hot press to produce a well bonded laminated bearing. The uniformly distributed molybdenum disulphide in the phenolic resin of the bearings provided for outstanding low coefficient of friction in use.

*Example II*

An emulsified resin varnish was prepared in the same manner as described in Example I, except that an alcohol soluble cresylic acid-formaldehyde base resin with isopropyl alcohol as a solvent was used.

*Example III*

The following resinous impregnating composition was prepared by adding 0.67 part by weight of carboxymethyl cellulose to 14.8 parts by weight of water and stirring until the carboxymethyl cellulose was dissolved. To this solution there was added 0.34 part by weight of calcium lignin sulphonate and 0.16 part by weight of sodium hydroxide. To the resulting emulsion there was added 48 parts by weight of an alcohol soluble cresylic acid-formaldehyde base resin, and 16 parts by weight of isopropyl alcohol, the mixture being stirred for 15 minutes. To this emulsified resin varnish there was then added 325 mesh aluminum oxide and the mixture stirred until the aluminum oxide was completely dispersed. The resinous impregnating composition was then ready for use.

*Example IV*

An emulsified resin varnish composition was prepared in the same manner as described in Example III, except that no alcohol was used to stabilize the solution, and graphite was used as a lubricant. The following ingredients were used in preparing the formulation: 16.5 parts by weight of graphite, 62.4 parts by weight cresylic acid-formaldehyde base resin, 19.4 parts by weight tap water, 0.9 part by weight of carboxymethyl cellulose, 0.5 part by weight calcium lignin sulphonate, and 0.3 part by weight of sodium hydroxide.

*Example V*

An emulsified resin impregnating composition was prepared in the same manner as described in Example III, except that silicon carbide was used as a wear resisting mineral compound instead of aluminum oxide. The following ingredients were used in the formulation of the composition: 56.4 parts by weight of silicon carbide, 30.1 parts by weight of a cresylic acid-formaldehyde base resin, 3.8 parts by weight of isopropyl alcohol, 0.4 part by weight carboxymethyl cellulose, 0.2 part by weight of calcium lignin sulphonate, and 0.1 part by weight of sodium hydroxide.

The preparation of the emulsified resin varnishes of my invention is greatly simplified over those known in the prior art as no heat and little stirring is required. After its preparation, it may be satisfactorily stored for considerable periods of time before use, either with or without the mineral compound suspended therein. The emulsified varnishes heretofore known do not hold the mineral compounds in suspension for any appreciable time.

The mineral compounds are dispersed throughout the resin with a remarkable degree of uniformity. The uniformly distributed mineral compounds facilitate making molded articles having outstanding coefficients of friction and/or wear resistant properties in use, together with abrasive qualties in selected applications.

Since certain obvious changes may be made in the above procedure and different embodiments of the invention could be made without departing from the scope thereof, it is intended that all matter contained in the above description shall be interpreted as illustrative and not in a limiting sense.

I claim as my invention:

1. A resinous impregnating composition comprising an A-stage emulsified phenolic resin comprising the potentially thermosettable reaction product of a phenol selected from the group consisting of phenol, cresol, and cresylic acid and an aldehyde selected from the group consisting of formaldehyde and paraformaldehyde, having admixed therewith from 0.5% to 3% by weight of a suspending agent selected from the group consisting of carboxy methyl cellulose, methyl cellulose, casein, sodium alginate, and gum tragacanth, from 0.1% to 3% by weight of a dispersing agent selected from the group consisting of sodium and calcium lignin sulphonate, and substantially 0.2% by weight of an alkali to solubilize the dispersing agent, the emulsified resin having suspended there at least one mineral compound selected from the group consisting of aluminum oxide, and silicon carbide in an amount by weight, based on the weight of the emulsified resin, as follows: 5% to 30% of aluminum oxide, and 10% to 60% of silicon carbide.

2. The resinous impregnating composition of claim 1 in which there is admixed from 5% to 25% by weight, based on the weight of the emulsified resin of an alcohol selected from the group consisting of methyl, ethyl, and propyl, the alcohol acting as a stabilizing agent for the resin emulsion.

3. A laminated material comprising, in combination, a fibrous base material, at least one mineral compound for modifying the properties of the material, a small but effective amount of a suspending agent for the mineral compound selected from the group consisting of carboxy methyl cellulose, methyl cellulose, casein, sodium alginate and gum tragacanth, a small but effective amount of a dispersing agent of a lignin sulphonate, a small but effective amount of an alkali to solubilize the dispersing agent, and a phenolic resin comprising the potentially thermosettable reaction product of a phenol selected from the group consisting of phenol, cresol, and cresylic acid and an aldehyde selected from the group consisting of formaldehyde and paraformaldehyde, the whole consolidated under heat and pressure.

4. A laminated material comprising, in combination, a fibrous base material, at least one mineral compound for modifying the properties of the material, a small but effective amount of a suspending agent for the mineral compound selected from the group consisting of carboxy methyl cellulose, methyl cellulose, casein, sodium alginate and gum tragacanth, a small but effective amount of a dispersing agent of a lignin sulphonate, a small but effective amount of an alkali to solubilize the dispersing agent, and a phenolic resin derived from the reaction product of a phenol selected from the group consisting of phenol, cresol, and cresylic acid, and an aldehyde selected from the group consisting of formaldehyde and paraformaldehyde, the whole consolidated under heat and pressure.

5. A laminated material comprising, in combination, a fibrous base material impregnated with an emulsified phenolic resin varnish, which upon being subjected to heat and pressure will form a cured infusible whole, the phenolic resin being derived from the reaction product of a phenol selected from the group consisting of phenol, cresol, and cresylic acid, and an aldehyde selected from the group consisting of formaldehyde and paraformaldehyde, there being suspended in the emulsified resin, at least one mineral compound and from 0.5% to 3% by weight, based on the weight of the emulsified resin, of a suspending agent for the mineral compound selected from the group consisting of carboxy methyl cellulose, methyl cellulose, casein, sodium alginate, and gum tragacanth, from 0.1% to 3% by weight, based on the weight of the emulsified resin, of a dispersing agent selected from the group consisting of sodium and calcium lignin sulphonate, and substantially 0.2% by weight, based on the weight of the emulsified resin, of an alkali to solubilize the dispersing agent.

6. In a laminated article, a plurality of resin impregnated sheets bonded together by heat and pressure as a whole, the sheets being initially impregnated with an emulsified phenolic resin varnish, the resin being derived from the reaction product of a phenol, selected from the group consisting of phenol, cresol, and cresylic acid, and an aldehyde selected from the group consisting of formaldehyde and paraformaldehyde, there being admixed with the resin from 0.5% to 3% by weight of a suspending agent selected from the group consisting of carboxy methyl cellulose, methyl cellulose, casein, sodium alginate, and gum tragacanth, from 0.1% to 3% by weight of a dispersing agent selected from the group consisting of sodium and calcium lignin sulphonate, and substantially 0.2% by weight of an alkali to solubilize the dispersing agent, there being suspended in the resin varnish at least one mineral compound selected from the group consisting of aluminum oxide and silicon carbide in an amount by weight, based on the weight of the emulsified phenolic resin varnish as follows, 5% to 30% of aluminum oxide, 10% to 60% of silicon carbide.

7. A resinous impregnating composition comprising an A-stage emulsified phenolic resin comprising the potentially thermosettable reaction product of a phenol selected from the group consisting of phenol, cresol, and cresylic acid and an aldehyde selected from the group consisting of formaldehyde and paraformaldehyde, having admixed therewith from 0.5% to 3% by weight of a suspending agent selected from the group consisting of carboxy methyl cellulose, methyl cellulose, casein, sodium alginate, and gum tragacanth, from 0.1% to 3% by weight of a dispersing agent selected from the group consisting of sodium and calcium lignin sulphonate, and substantially 0.2% by weight of an alkali to solubilize the dispersing agent, the emulsified resin having suspended therein from 3% to 20% by weight of graphite, based on the weight of the emulsified resin.

8. The resinous impregnating composition of claim 7 in which there is admixed from 5% to 25% by weight, based on the weight of the emulsified resin of an alcohol selected from the group consisting of methyl, ethyl, and propyl, the alcohol acting as a stabilizing agent for the resin emulsion.

9. A resinous impregnating composition comprising an A-stage emulsified phenolic resin comprising the potentially thermosettable reaction product of a phenol selected from the group consisting of phenol, cresol, and cresylic acid and an aldehyde selected from the group consisting of formaldehyde and paraformaldehyde, having admixed therewith from 0.5% to 3% by weight of a suspending agent selected from the group consisting of carboxy methyl cellulose, methyl cellulose, casein, sodium alginate, and gum tragacanth, from 0.1% to 3% by weight of a dispersing agent selected from the group consisting of sodium and calcium lignin sulphonate, and substantially 0.2% by weight of an alkali to solubilize the dispersing agent, the emulsified resin having suspended therein at least one mineral compound.

10. The resinous impregnating composition of claim 9 in which there is admixed from 5% to 25% by weight, based on the weight of the emulsified resin of an alcohol selected from the group consisting of methyl, ethyl, and propyl, the alcohol acting as a stabilizing agent for the resin emulsion.

11. In a laminated article, a plurality of resin impregnated sheets bonded together by heat and pressure as a whole, the sheets being initially impregnated with an emulsified phenolic resin varnish, the resin being derived from the reaction product of a phenol, selected from the group consisting of phenol, cresol, and cresylic acid, and an aldehyde selected from the group consisting of formaldehyde and paraformaldehyde, there being admixed with the resin from 0.5% to 3% by weight of a suspending agent selected from the group consisting of carboxy methyl cellulose, methyl cellulose, casein, sodium alginate, and gum tragacanth, from 0.1% to 3% by weight of a dispersing agent selected from the group consisting of sodium and calcium lignin sulphonate, and substantially 0.2% by weight of an alkali to solubilize the dispersing agent, there being suspended in the resin varnish from 3% to 20% by weight of graphite, based on the weight of the emulsified resin varnish.

12. In a laminated article, a plurality of resin impregnated sheets bonded together by heat and pressure as a whole, the sheets being initially impregnated with an emulsified phenolic resin varnish, the resin being derived from the reaction product of a phenol, selected from the group consisting of phenol, cresol, and cresylic acid, and an aldehyde selected from the group consisting of formaldehyde and paraformaldehyde, there being admixed with the resin from 0.5% to 3% by weight of a suspending agent selected from the group consisting of carboxy methyl cellulose, methyl cellulose, casein, sodium alginate, and gum tragacanth, from 0.1% to 3% by weight of a dispersing agent selected from the group consisting of sodium and calcium lignin sulphonate, and substantially 0.2% by weight of an alkali to solubilize the dispersing agent, there being suspended in the resin varnish at least one finely divided mineral compound for modifying the properties of the article.

References Cited in the file of this patent

UNITED STATES PATENTS

| Number | Name | Date |
|---|---|---|
| 1,458,943 | Kinney | June 19, 1923 |
| 2,061,931 | Benner et al. | Nov. 24, 1936 |
| 2,190,672 | Meharg | Feb. 20, 1940 |
| 2,233,206 | Frederick | Feb. 25, 1941 |
| 2,385,320 | Greene et al. | Sept. 18, 1945 |
| 2,427,481 | Weible | Sept. 16, 1947 |
| 2,433,643 | Beach et al. | Dec. 30, 1947 |
| 2,462,253 | Booty | Feb. 22, 1949 |
| 2,467,498 | Redfern | Apr. 19, 1949 |
| 2,489,228 | Rudd | Nov. 22, 1949 |
| 2,525,835 | Schmutzler | Oct. 17, 1950 |
| 2,530,770 | Hopperstead | Nov. 21, 1950 |
| 2,562,641 | Saunders | July 31, 1951 |
| 2,581,301 | Saywell | Jan. 1, 1952 |
| 2,600,321 | Pyle | June 20, 1952 |